US012669334B1

(12) United States Patent (10) Patent No.: US 12,669,334 B1
Russell et al. (45) Date of Patent: Jun. 30, 2026

(54) MULTI-AGENT SEARCHING FOR FAST DETERMINATION OF DECONFLICTED TRAJECTORIES

(71) Applicant: BIRKET IP HOLDINGS, INC., Winter Garden, FL (US)

(72) Inventors: David Wayne Russell, Winter Garden, FL (US); Frederick Michael Meyer, Fountain Hills, AZ (US)

(73) Assignee: BIRKET IP HOLDINGS, INC., Winter Garden, FL (US)

( * ) Notice: Subject to any disclaimer, the term of this patent is extended or adjusted under 35 U.S.C. 154(b) by 0 days.

(21) Appl. No.: 18/619,256

(22) Filed: Mar. 28, 2024

Related U.S. Application Data

(63) Continuation of application No. 17/489,642, filed on Sep. 29, 2021, now abandoned.

(Continued)

(51) Int. Cl.
| | |
|---|---|
| *G01C 21/20* | (2006.01) |
| *G05D 1/00* | (2024.01) |
| *G05D 1/221* | (2024.01) |
| *G05D 1/229* | (2024.01) |
| *G05D 1/246* | (2024.01) |
| *G05D 1/622* | (2024.01) |
| *G08G 5/00* | (2025.01) |
| *G08G 5/20* | (2025.01) |

(Continued)

(52) U.S. Cl.
CPC .............. *G01C 21/20* (2013.01); *G05D 1/00* (2013.01); *G05D 1/104* (2013.01); *G05D 1/221* (2024.01); *G05D 1/2295* (2024.01); *G05D 1/2464* (2024.01); *G05D 1/2465*

(2024.01); *G05D 1/2469* (2024.01); *G05D 1/637* (2024.01); *G08G 5/00* (2013.01); *G08G 5/20* (2025.01); *G08G 5/25* (2025.01); *G08G 5/55* (2025.01); *G08G 5/57* (2025.01); *G08G 5/26* (2025.01); *G08G 5/50* (2025.01); *G08G 5/56* (2025.01)

(58) Field of Classification Search
CPC .......... G01C 21/20; G05D 1/00; G05D 1/104; G05D 1/221; G05D 1/2295; G05D 1/2464; G05D 1/2465; G05D 1/2469; G05D 1/637; G08G 5/00; G08G 5/20; G08G 5/25; G08G 5/55; G08G 5/57
See application file for complete search history.

(56) References Cited

U.S. PATENT DOCUMENTS

| | | | | |
|---|---|---|---|---|
| 7,469,183 B2 * | 12/2008 | Bodin | .................. | G05D 1/0027 701/3 |
| 7,970,532 B2 * | 6/2011 | Tehan | .................. | G05D 1/0646 701/423 |

(Continued)

FOREIGN PATENT DOCUMENTS

| | | | | | |
|---|---|---|---|---|---|
| GB | 899868 | A | * | 1/1900 | ............... H03K 5/13 |
| GB | 130342 | A | * | 6/1918 | ........... B29C 73/163 |

(Continued)

*Primary Examiner* — Bryce P Bonzo
(74) *Attorney, Agent, or Firm* — ALLEN, DYER, DOPPELT + GILCHIRST, P.A.

(57) ABSTRACT

A methodology for a multi-agent cooperative autorouting system with multiple dimensions uses time as one dimension to allow the computation of Correct by Construction navigational trajectories taking timed events and other vehicles moving within the space into account to achieve path deconfliction.

13 Claims, 10 Drawing Sheets

Related U.S. Application Data

(60) Provisional application No. 63/084,572, filed on Sep. 29, 2020.

(51) Int. Cl.

| | | |
|---|---|---|
| *G08G 5/25* | (2025.01) |
| *G08G 5/26* | (2025.01) |
| *G08G 5/50* | (2025.01) |
| *G08G 5/55* | (2025.01) |
| *G08G 5/56* | (2025.01) |
| *G08G 5/57* | (2025.01) |

(56) References Cited

U.S. PATENT DOCUMENTS

| | | | | |
|---|---|---|---|---|
| 8,315,794 | B1 * | 11/2012 | Strelow | G05D 1/104 |
| | | | | 701/2 |
| 8,543,265 | B2 * | 9/2013 | Ekhaguere | G08G 5/723 |
| | | | | 701/423 |
| 8,798,922 | B2 * | 8/2014 | Tillotson | G08G 5/34 |
| | | | | 701/474 |
| 8,965,679 | B2 * | 2/2015 | Euteneuer | G08G 5/57 |
| | | | | 701/122 |
| 11,868,145 | B1 * | 1/2024 | Lopez | G08G 5/22 |
| 12,208,821 | B1 * | 1/2025 | Schnackel | B60W 60/0016 |
| 2001/0023390 | A1 * | 9/2001 | Gia | G01C 21/3881 |
| | | | | 701/14 |
| 2005/0192749 | A1 * | 9/2005 | Flann | G01C 21/20 |
| | | | | 701/410 |
| 2009/0210109 | A1 * | 8/2009 | Ravenscroft | G01C 21/20 |
| | | | | 701/25 |
| 2010/0224732 | A1 * | 9/2010 | Olson | H04B 7/18504 |
| | | | | 244/190 |
| 2012/0038501 | A1 * | 2/2012 | Schulte | G08G 5/26 |
| | | | | 342/30 |
| 2012/0158280 | A1 * | 6/2012 | Ravenscroft | G08G 5/32 |
| | | | | 701/400 |

| | | | | |
|---|---|---|---|---|
| 2014/0129059 | A1 * | 5/2014 | Scarlatti | B60L 53/80 |
| | | | | 701/16 |
| 2014/0249693 | A1 * | 9/2014 | Stark | G08G 5/32 |
| | | | | 701/2 |
| 2016/0202695 | A1 * | 7/2016 | Deroos | G08G 5/74 |
| | | | | 701/2 |
| 2016/0284221 | A1 * | 9/2016 | Hinkle | G01C 21/20 |
| 2017/0116863 | A1 * | 4/2017 | Valls Hernández | G08G 5/59 |
| 2018/0180428 | A1 * | 6/2018 | Grimm | G08G 3/02 |
| 2018/0204469 | A1 * | 7/2018 | Moster | G08G 5/34 |
| 2019/0051198 | A1 * | 2/2019 | Nimmagadda | G08G 9/02 |
| 2019/0079526 | A1 * | 3/2019 | Vallespi-Gonzalez | |
| | | | | G01S 7/4802 |
| 2020/0047750 | A1 * | 2/2020 | Likhachev | G05D 1/0214 |
| 2020/0082729 | A1 * | 3/2020 | Heiberg | G08G 5/55 |
| 2020/0265726 | A1 * | 8/2020 | Dupray | G08G 5/25 |
| 2021/0020049 | A1 * | 1/2021 | Nathan | G08G 5/26 |
| 2021/0082293 | A1 * | 3/2021 | Geng | G08G 5/53 |
| 2021/0165426 | A1 * | 6/2021 | White | G05D 1/101 |
| 2021/0325906 | A1 * | 10/2021 | White | G01C 21/3807 |
| 2021/0373580 | A1 * | 12/2021 | Morales Delgado | G08G 5/55 |
| 2022/0020281 | A1 * | 1/2022 | Stoppok | G08G 5/22 |
| 2022/0026920 | A1 * | 1/2022 | Ebrahimi Afrouzi | |
| | | | | G06N 3/0495 |
| 2022/0066456 | A1 * | 3/2022 | Ebrahimi Afrouzi | |
| | | | | G06F 3/04883 |
| 2022/0080996 | A1 * | 3/2022 | Brown | B60W 30/143 |
| 2022/0187841 | A1 * | 6/2022 | Ebrahimi Afrouzi | |
| | | | | G05D 1/0272 |
| 2022/0270495 | A1 * | 8/2022 | Pele | G08G 5/30 |
| 2024/0310851 | A1 * | 9/2024 | Ebrahimi Afrouzi | G01S 17/87 |
| 2025/0178568 | A1 * | 6/2025 | Gustavsson | E02F 9/2083 |
| 2026/0060187 | A1 * | 3/2026 | Loppnow | A01G 25/167 |

FOREIGN PATENT DOCUMENTS

| | | | | | |
|---|---|---|---|---|---|
| WO | WO-2016193690 | A1 * | 12/2016 | | B64U 50/14 |
| WO | WO-2019212892 | A2 * | 11/2019 | | G08G 5/70 |
| WO | WO-2022064166 | A1 * | 3/2022 | | G08G 5/80 |
| WO | WO-2024099553 | A1 * | 5/2024 | | G05D 1/247 |

* cited by examiner

Figure 6A:
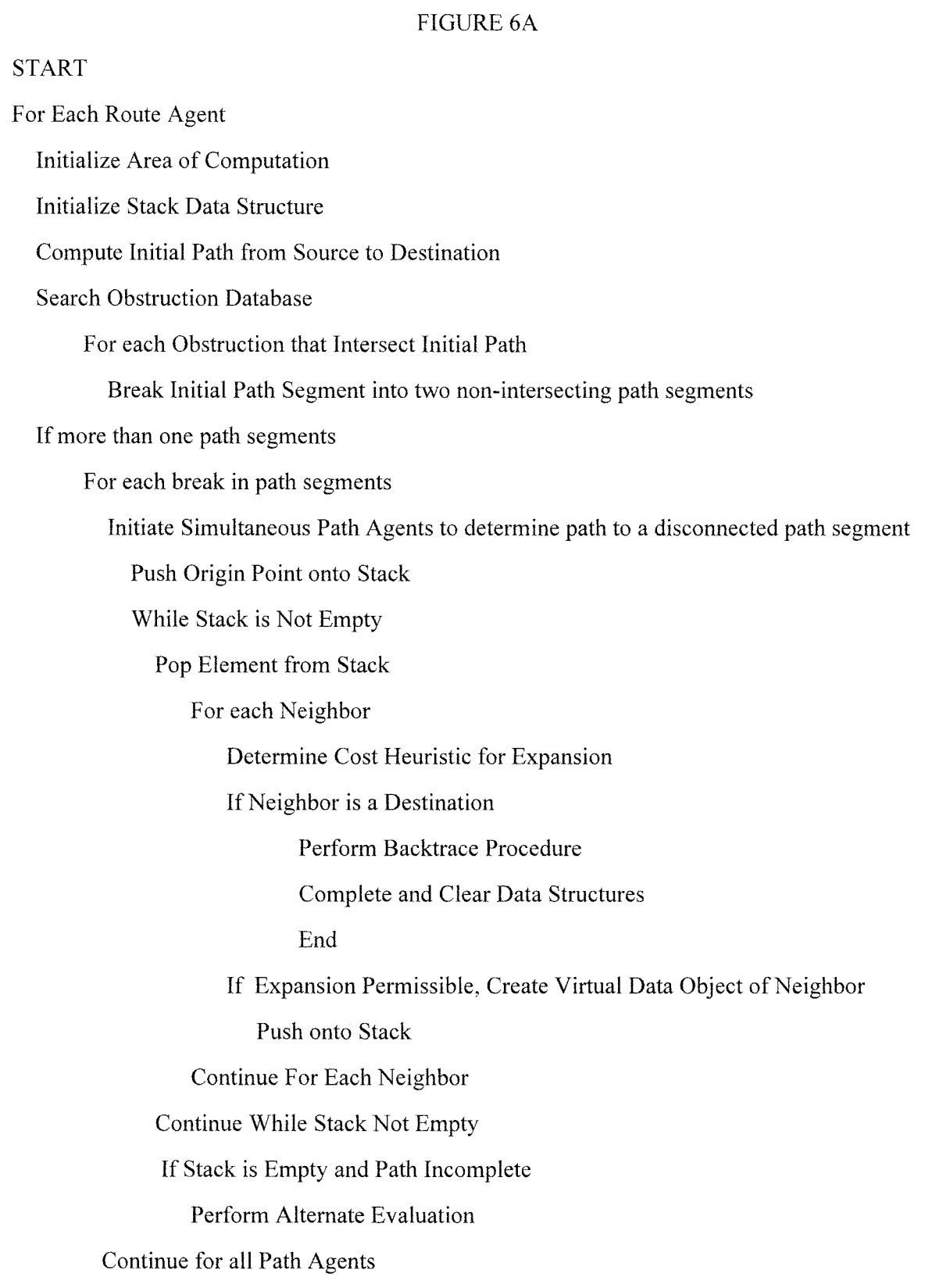

START

For Each Route Agent

Initialize Area of Computation

Initialize Stack Data Structure

Compute Initial Path from Source to Destination

Search Obstruction Database

For each Obstruction that Intersect Initial Path

Break Initial Path Segment into two non-intersecting path segments

If more than one path segments

For each break in path segments

Initiate Simultaneous Path Agents to determine path to a disconnected path segment Push Origin Point onto Stack While Stack is Not Empty Pop Element from Stack For each Neighbor Determine Cost Heuristic for Expansion If Neighbor is a Destination Perform Backtrace Procedure Complete and Clear Data Structures End If  Expansion Permissible, Create Virtual Data Object of Neighbor Push onto Stack Continue For Each Neighbor Continue While Stack Not Empty If Stack is Empty and Path Incomplete Perform Alternate Evaluation Continue for all Path Agents

FIGURE 6B

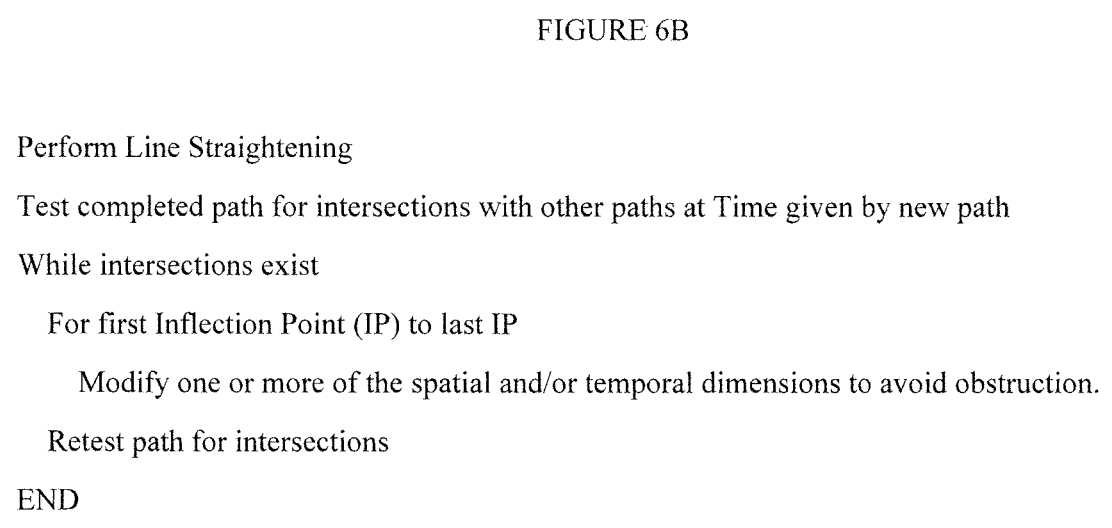

Perform Line Straightening

Test completed path for intersections with other paths at Time given by new path While intersections exist For first Inflection Point (IP) to last IP Modify one or more of the spatial and/or temporal dimensions to avoid obstruction.

Retest path for intersections

END

MULTI-AGENT SEARCHING FOR FAST DETERMINATION OF DECONFLICTED TRAJECTORIES

PRIORITY APPLICATION(S)

This continuation application claims priority to U.S. patent application Ser. No. 17/489,642 filed Sep. 29, 2021, which claims priority to U.S. Provisional Application No. 63/084,572 filed Sep. 29, 2020, the disclosures which are hereby incorporated by reference in their entirety.

FIELD OF THE INVENTION

The present invention relates to air traffic management of manned or unmanned autonomous vehicles (UAVs) and fleets, autorouting algorithms, and more specifically to an algorithmic method and system for multi-agent searching to determine simultaneous collaborative planning of multiple vehicle trajectories without human involvement.

BACKGROUND OF THE INVENTION

Previous attempts at cooperative trajectory management systems, either for single vehicles for fleet planning, was performed manually, by simulation, or by autorouting through a 2- or 3-Dimensional model or simulation of the Area of Operation (AO). Gridded autorouting, as first taught by Lee and Moore in 1961 guarantees to find a path if one exists, but the computational runtime and storage requirements increase with the order of dimensions in the search. For example, a 2-Dimensional search requires $O(N{}2)$ time and storage, while a 3-Dimensional search requires $O(N{}3)$ time and storage.

Increasing the accuracy of the search by a factor of 10, i.e., searching an area with 10 meter grids vs searching the same area with 1 meter grids, would increase runtime and storage by a factor of 100 for a 2-Dimensional system and a factor of 1000 for a 3-Dimensional system.

Other routing systems, such as Hightower in 1969 use line segments or probes in an attempt to alleviate this grid multiplication factor, however probe routers, while fast and low in computational resources, are not guaranteed to find a path as they are not exhaustive searches.

Additionally, these routing techniques are constrained by the geometry of the computation algorithm or modality. Grid routers are often constrained without limitation by the grid to 90-degree and 45-degree movements resulting in "stairstep" routes at other angles. Probe routers are often constrained by the same factors as the computational and storage requirements of the probe system increase by the number of angles considered.

Simplistic "up-over-down" path computations on line-of-sight headings can be used in simplistic environments such as farms and rural areas, but are not guaranteed to find a solution in complex environments and lack the 4-Dimensional computation complexity to provide paths between multiple vehicles which are cooperative, i.e., do not intersect, and are Correct by Construction thereby needing no human checking or intervention.

A new methodology for creating cooperative trajectories through complex environments at high speed is needed.

SUMMARY OF THE INVENTION

It should be appreciated that this summary is provided to introduce a selection of concepts in a simplified form that are further described below in the Detailed Description. This summary is not intended to be used to limit the scope of the claimed subject matter.

An area of operation (AO) is first modeled in three dimensions (3D). This may be done with LIDAR or 3D technology or by stacking multiple 2-dimensional (2D) models to achieve the minimal characteristics of a 3D model. A novel combination of virtual grid routing and probe routing techniques is detailed below to find a path from a source point to a destination point within the model, taking all other know vehicle trajectories into account.

In the gridded model, the storage complexity and run-time are described in terms of the number of grids per unit space, N, over a grid area of X, Y, or X, Y, Z. The total search area in grids is then $(N{*}X{*}Y{*}Z)$. Additionally, each grid of the matrix contains both static information related to the model and information that is dynamic during the search. Therefore, if more than one search is being attempted within the matrix at the same time, a memory lockout management system is required so that one process does not overwrite the dynamic data of another process. In practice, this only allows for multiple simultaneous routes within the AO if they are very far apart.

While it is possible that a search could touch each grid of this AO, in practice a breadth-first search spreads out in all dimensions from a starting grid until it encounters the destination grid. This means that the radius R, i.e. the distance between the source and destination points, is of great significance in the actual runtime of the algorithm, although the storage requirements do not necessarily change. The smaller the R, the faster runtime will be as the cube-root, such that it is wise to minimize $(R{*}X{*}Y{*}Z)$.

In server farms most often used today in cloud-based or multiple-CPU computational strategies, Multi-Agent Computational techniques are often employed when the problem can be broken down into multiple independent computational segments of the overall problem. This is also possible to implement and/or simulate in single-processor systems, but the overall system speed only increases with the actual number of Agents that can operate simultaneously in the problem space.

Trajectory requests may be executed on a first-come-first-served basis or executed on the basis of which ones have the shortest interval to requested launch time or have a priority associated with them to alter their basis within the execution queue, such as but not limited to law enforcement or government agencies or for-fee expediting of commercial services.

This invention provides the system and methodology whereby R is significantly decreased, source-to-destination line-of-sight geometry is preserved at any angle to maximize the efficiency of the planned route, and Multi-Agent computational techniques may be brought to bear to further increase the speed with which the cooperative flight path may be achieved. In practice, the dimension of Z, or altitude, may be significantly smaller than X and Y and can be reduced further by imposing set altitude minimum separation distances, for example but not limited to 5 meters, between flightpaths. This also reduces runtime and storage for the system.

Each trajectory is conceptualized as a segment with a given average velocity. The geometric order of the segment is dependent on the desired results, and one familiar with the art would see that a first order line segment, i.e., $Y=mx+b$ or a second order segment, such as $Y=ax^2+bX+C$ or higher order representations make no difference to the operation of the system as described.

In order to simplify the architecture and computational complexity, this embodiment utilizes the fact that any system of multiple variables may be expressed in relation to an additional variable. As velocity is one of the factors we wish to preserve with each segment and velocity is a derivative the distance with respect to Time, we can express each segment as a multivariate:

$$X = f(T);$$
$$Y = f(T);$$
$$Z = f(T);$$

In so doing we have integrated all four dimensions we seek within a single computational structure.

The final path from source to destination will be an ordered list of these segments. In this embodiment the path will be defined as a series of splines, which provides an additional benefit in that the splines can be defined such that the velocity at the "knots" or transition points is constant and therefore the acceleration is zero. This is of great benefit to defining the paths of moving vehicles.

In one embodiment, to create a 4-Dimensional cooperative path, first the line of sight vector is computed from the source to the destination. Next, the database of the AO 3D structure is searched to find any structures that intersect this line. This search may also be completed utilizing Multi-Agent, Mesh, or other search techniques.

If a building, structure, or terrain feature intersects the path, such that the vehicle cannot simply fly over it—the building is taller than a preset altitude limit, for example—then the line segment is broken for each intersection feature but each segment is linked in the data structure so that it still retains the information that allows for a source to destination ordering of the segments. For this example we will consider that there is one obstruction, a tall building, that is in the direct path from source S to destination D, and the result of the obstacle search is that two new points, A and B representing each side of the obstruction are added, and the initial line becomes two, S-A leading up to the obstruction, and B-D leaving the obstruction.

Once this step in the process is complete, a virtual gridded route system is imposed to determine a path from A to B, thus completing the route from S to D. This is the primary feature of the algorithm that minimizes R, i.e., R is now the distance A-B the size of the building, instead of S to D the size of the overall path which could be kilometers.

A new virtual grid system is described where the "grids" are a computational structure for keeping track of the search, not actual storage of all the 3D model grids representing the AO in the system. In this way, the storage required in the system is separated into the static elements, held in the database, and the dynamic data for the route which is now only on the order of R, not the entire AO. In this example, we will assume that two new points, 1 and 2, provide a path around the building.

Additionally, since each search is assigned a different Agent, each agent maintains its own virtual grid of just the dynamic data and the need for lockout and memory management is removed. If, in another example, there were 10 obstacles breaking up the original S-D segment, a separate agent would be assigned to each break to determine the best path around that particular obstacle to complete the original segment. As the requirement that no two searches may work in the same area is removed, multiple route Agents utilizing different algorithms could be utilized simultaneously in the same obstruction segment with different cost functions and/ or different routing algorithms to find the lowest cost or "best" path given the cost function metrics.

In one embodiment the existence of other routes in the grid area are treated as a special case of static obstructions, and the cost function is modified during the expansion process such that crossing an existing path alters the cost of the route. This tends to make the path choose a slightly different route that does not cross an existing path.

Different costs may be assigned by the probability that the two vehicles will actually be in conflict. For an example without limitation, a low cost factor might be added if two paths intersect but at significantly different times at that point, a medium cost factor might be added if the two paths have a low probability of conflict, and a high cost factor might be added if the two paths have a high probability of conflict. These cost function modifications tend to create deconflicted paths but it is possible that the only path found between the source and destination points goes through this intersection and if so then additional algorithmic means of altering the timing of the new path (4-Dimensional Deconfliction) would be utilized to allow the path and still deconflict the path.

In another embodiment the existence of other paths may be ignored during the initial search phase and considered instead during subsequent phases where the line is being modified by other processes anyway, which would make consideration of the routes in this first phase ineffective.

Once the broken segment is reconnected, the full path now exists within the AO, i.e., a list of segments S-A-1-2-B-D.

Once the initial route is complete it may be modified by other processes such as without limitation line straightening, substitution of curves for angled turns, minimum radius turns, etc. This final geometry is then ready for further testing.

If a conflict does exist, this creates what we term an Inflection Point (IP) at the X, Y, Z and Time (T) of where the two would collide. If the IP occurs, for example, in the segment between 1 and 2, the path could now be denoted as S-A-1-IP-2-B-D. As the velocity of the existing (previously routed) vehicle is known and the minimum safe spacing between the aircraft would be a constant or parameter given to the system, or otherwise derived, the minimum and maximum time of the intersect window between the two vehicles may be computed. In order for these two paths to coexist, the new path must be either sped up to pass the IP first, or slowed down to pass through the IP after the original vehicle has already exited by a safe margin.

This only requires that the velocity of the segments before the IP be increased or decreased accordingly. This could be limited to just the 1-IP segment, or velocities could be changed all the way back to S-A-1-IP segments. The system could also then adjust velocities IP-2-B-D if necessary or desirable to meet a given landing time window. If multiple conflicts are detected, multiple corresponding IP points are created, and each segment's velocity is adjusted accordingly. In one embodiment, the system can process these IP velocity changes keeping track of whether the preceding velocity was increased or decreased overall and use the opposite strategy at the next IP to maintain an overall average velocity for the vehicle.

Additionally, the velocity component of each line segment could be a simple constant or a higher order function which is also time dependent, offering multiple strategies for $4^{th}$ Dimensional adjustment of the path. Either way, it is possible that either existing waypoint navigation methodology with time waypoints or specified velocities between waypoints can be used, or more complex multivariate forms as given above utilized. Either way, it is possible to interpolate from the given segments and time/velocity information where and when the vehicle will be at a given time within a specified degree of confidence, which allows the system to perform sufficiently accurate comparisons of flight path performance to determine the window of a possible conflict in the paths and therefore the safe margin between them. Each time any of the dimensions of the flight plan are modified, they may need to be tested again and modified to guarantee deconfliction.

This combination of initiating a Source to Destination probe as the first step of the process, combined then with a virtual gridded search that is guaranteed to find a path while maintaining a minimum R distance is key to creating an overall most-efficient path from S to D. While it is possible, and previously described, that the $4^{th}$-dimension comparison of existing paths could be done in the search phase to avoid creating conflicting paths in the first place, it is also true that this would not guarantee that a conflicting path would not be created and moving the $4^{th}$ Dimension to the third phase and simply altering the velocity of the segment is critical to enabling Multi-Agent Computing to be applied to this problem.

In another embodiment, the grid count (R*X*Y*Z) is reduced by removing the dependency on grids entirely. The free or navigable pace of the 3D model is tessellated into polygons, where the count of polygons is much smaller than the number grids. Each face of the polygon would be shared with exactly one other polygon or with no other polygon if that face was blocked by an obstruction. The obstructions require no storage space, they simply cease to exist within the model.

A tree is constructed that graphically depicts the relationships between the polygons, their faces, and the connecting polygons. This graph may be searched for a connection between the polygon which contains the source point, and the polygon containing the destination point, which could both be within the same polygon.

BRIEF DESCRIPTION OF THE DRAWINGS

Illustrative embodiments of the present invention, as well as a preferred mode of use, further objectives, and features thereof will best be understood by reference to the following detailed description of illustrative embodiments of the present disclosure when read in conjunction with the accompanying drawings wherein:

FIGS. 6A and 6B are a pseudo-code example of a multi-agent search program.

DETAILED DESCRIPTION

Figure 1:
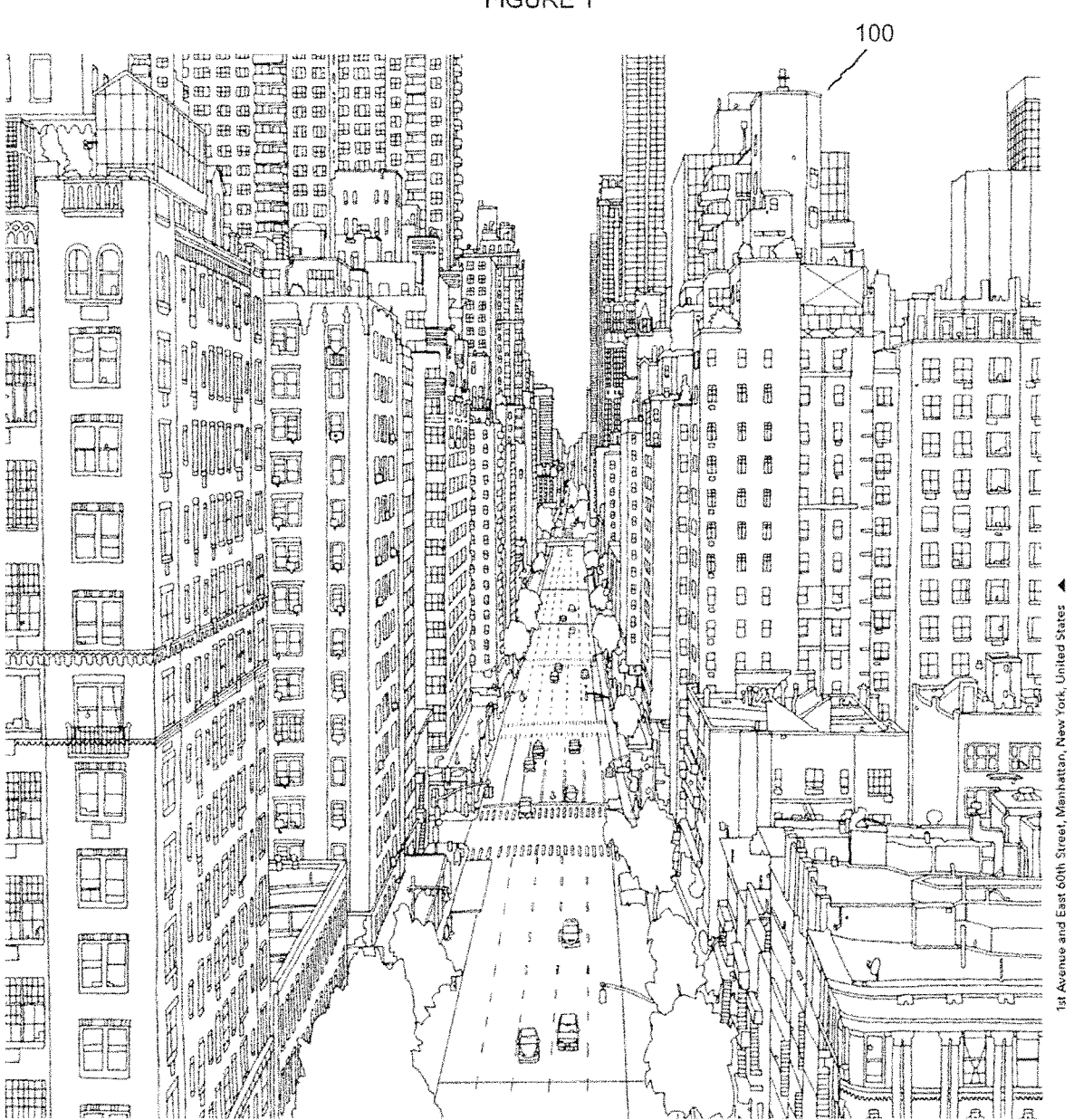
FIG. 1 depicts a 3D model of an Area of Operation (AO).

Referring now to the invention in more detail, in FIG. 1, there is shown a three-dimensional (3D) model of an urban area. The different illustrative embodiments recognize and take into account a number of different considerations. "A number," as used herein with reference to items, means one or more items. For example, "a number of different considerations" means one or more different considerations. "Some number," as used herein with reference to items, means zero or more items. Unless otherwise noted X and Y are intended to reference ground width and breadth coordinate systems, and Z is intended to reference altitude, height, or altitude Above Ground Level (AGL). For brevity, the value of Z will always be positive, indicative of altitude AGL.

The number of physical and temporal dimensions are shown as 3 or more for illustrative purposes, however lower or higher physical and multiple temporal dimensions are possible without altering the intent of the invention. While the words "flight path" may be used for illustrative purposes, the physical and temporal dimensions of the resultant trajectory may be utilized in any environment with moving parts from flight vehicles to surface vehicles to robotics actuators to self-adjusting shelving. In some embodiments, the dimensions may not be directly related to physical dimensions but may denote information spaces or other virtual or non-physical areas of interest.

In FIG. 1, the depiction of the static ground structures and obstacles 100 may be more or less detailed than the actual model. In one embodiment, the model may be taken from LIDAR mapping, potentially with more detail in some areas and less detail in others. With LIDAR data, the 3D map is essentially a sequence of square or rectangular (X and Y axes) adjoining pillars each providing the height as given by the LIDAR altimeter (Z axis). LIDAR maps often, without limitation, vary from centimeters to meters between points.

In one embodiment the specification for location is given by GPS coordinate format, where a given number of decimal places, obtained either as a constant or algorithmic determination, are utilized as the mathematical basis of the coordinate system. Other metrics such as meters, can be provided in some circumstances and then translated into or out of the GPS framework. In another embodiment the metrics may not correspond to physical geometry but may be, without limitation, representative of differential categories of informational space.

In other embodiments or models, satellite measurements, photogrammetry, optical differencing and other methods may be used to determine full 3D modeling parameters from other measurements and computational geometry. Keep-out areas, such as airports and restricted airspace can also be included in the static 3D model database. Other obstructions might be dynamic, such as an area closed off as a block reservation for piloted or specialized flights in an area for a given period of time. These are handled the same as static obstructions but include an activation and expiration time and date. Other specialized obstructions might include a minimum altitude restriction over a specified area either permanently or as a timed (dynamic) obstruction.

The 3D models are stored in a database format to allow quick access to the obstacles at a given location. In one embodiment this might be through kD-Tree or other computational algorithm or system without altering the intent of the invention. Other methodologies such as without limitation machine learning, hierarchical mixtures of experts, and specific data layering techniques might also be employed, but the intent of the database structure is to make recall of the obstacles associated with location as fast as possible.

In other embodiments where computational complexity is more costly than storage space, a hierarchical data structure may be constructed where the 3D model is accessed via larger areas leading to smaller areas but permanently stored and associated with the coordinate structure rather than or in addition to the database format.

In other embodiments the storage space may be more costly than the computational complexity and obstructions, polygons, and free space tessellations may be computed on-the-fly on an as-needed basis or a compressed version of the data may be stored as a compromise between storage and computation time.

Figure 2:
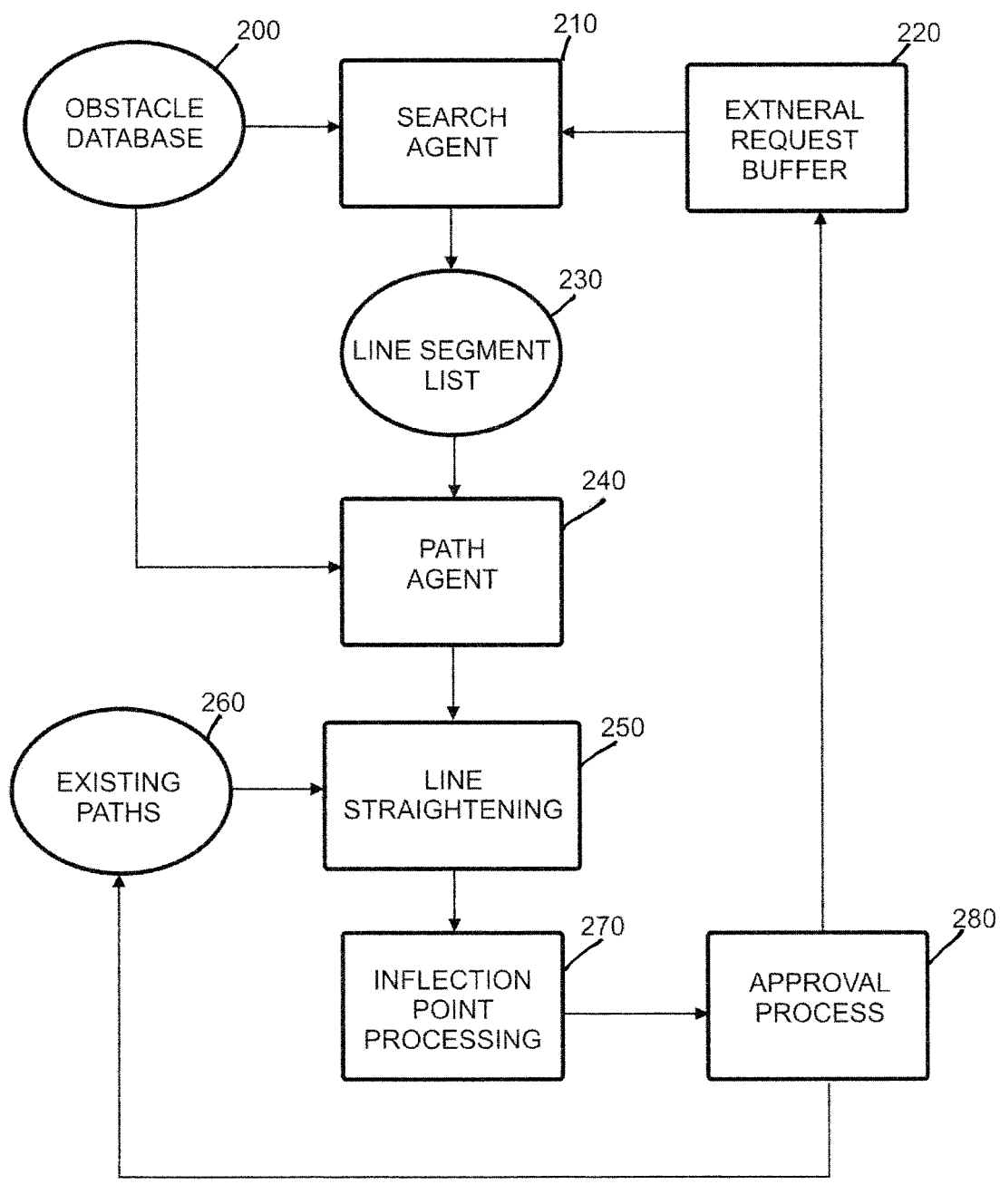
FIG. 2 depicts a flow chart of the overall Multi-Agent router process.

In FIG. 2, the relationship of this database of obstructions is shown 200 in relation to other data structures and operations of the system. In a Real-Time Flight Management System (RTFMS) or logistics operation, a number of requests for flight plans may come in at a high rate of speed or even simultaneously. They are added to a request buffer 220. As computational resources become available in the server farm, a Multi-Agent system 210 receives the request from the buffer, establishes the initial line segment 230 from Source to Destination, and then accesses the obstacle database 200 to determine the initial areas (if any) to be routed. These routing areas are then passed to other Agents 240 who also access the obstacle database to build a virtual grid representation of the path around the obstacle. In one embodiment of the Path Agent (PA) remains active until the route is completed. In other embodiments the PA could be released to begin other path requests as soon as the initial line segment lists are turned over to other agents. In the former case, the PA would be the data structure which holds this entire path until completed, and then it is returned to the requesting RTFMS. In the latter a secondary data structure tied to the request would hold the path data until completion.

In other embodiments, much if not all of the obstruction data that was used in the initial pass would also be used in the routing pass. A buffer, localized storage, or pointers to that data could also be passed to the Virtual Grid or Path Agent for greater efficiency. It is also possible without altering the intent of the invention that other routing strategies such as but not limited to probe routing, pattern routing, river routing, switchbox routing, mesh routing, and global routing could be used to determine the path around the obstruction to reconnect the initial line of sight path interrupted by the obstruction.

Once the route is complete, the Path Agent or another type of agent would then test the path against a data structure containing all of the existing flight paths of all known vehicles in the system 260. Flight path are tied to time, and as such new paths are constantly being added to this data structure and old paths are deleted from it automatically as they are completed or if they are cancelled or rescheduled. This keeps the list to a manageable size over time.

In another embodiment the data on temporary obstructions and/or other routes could be accessed by the search routines such that only routes that actually intersect within a given time window are penalized by the routing cost function, allowing maximum efficiency of the routes in space and time.

In another embodiment the data on temporary obstruction and/or other routes could be accessed by the search routines such that any temporary obstruction, whether within a given time window or not, are penalized by the cost function such that most route deconfliction can occur simply by construction of slightly different route paths with slightly higher costs which do not conflict in any way.

In another embodiment, the time window where routes are evaluated for conflict can vary from 0, an instantaneous expression of the position of the vehicle at a given time, to any other length of time. This allows for maximum efficiency in the utilization of the air space or a tradeoff between efficiency and simplification of some or all of the paths in the management system up to and including permanent paths or corridors.

The diameter of the path could vary from the basis diameter of the vehicle to the vehicle plus minimum spacing requirements between vehicles to a combination of those elements plus an avoidance limit. An avoidance limit could, without limitation, be a simple constant radius around the vehicle or a radius that varies with time, location, or other factors. The radius may be set by outside parameters or calculated by the system internally, or a combination of both.

If this comparison to old path creates one or more Inflection Points (IP) 270, the velocity of the path is altered by a system which tracks the total velocity of the vehicle over time and adjusts accordingly. Vehicle parameters such as but not limited to maximum altitude, climb and stall rates, battery time, fuel status, departure time, delivery time, weather patterns in the area, and preferred routes and corridors can be provided and taken into account in establishing both the initial flight vector and the obstacle avoidance flight segments. This includes the ability to stratify or layer paths such that North/South paths for example without limitation, are all kept at one layer or altitude, and East/West paths are kept at another altitude to simplify the use of space.

In another embodiment a probe routing or other technique could be used to create more than one initial vector in the open Area of Operation (AO) to make best use of rules for that area, and then these segments would, in turn be subjected to the same obstacle search and routing as a single vector path.

Once the entire path is constructed and tested for static and dynamic obstacles, it may then be transmitted to another certification body such as but not limited to the FAA's LAANC system for approval 280, and then the final flight plan and time of departure could be returned to the system making the request 220 and the path is stored for use with later routes 260. In other embodiments the flight path could also be reported to the appropriate flight authority in the region such as but not limited to the FAA's ADS-B system so that other aircraft would have knowledge of the flight plan and timing even if they could not see the vehicle.

In another embodiment, line straightening of the path 250 could be pre-formed before the IP processing.

Figure 3:
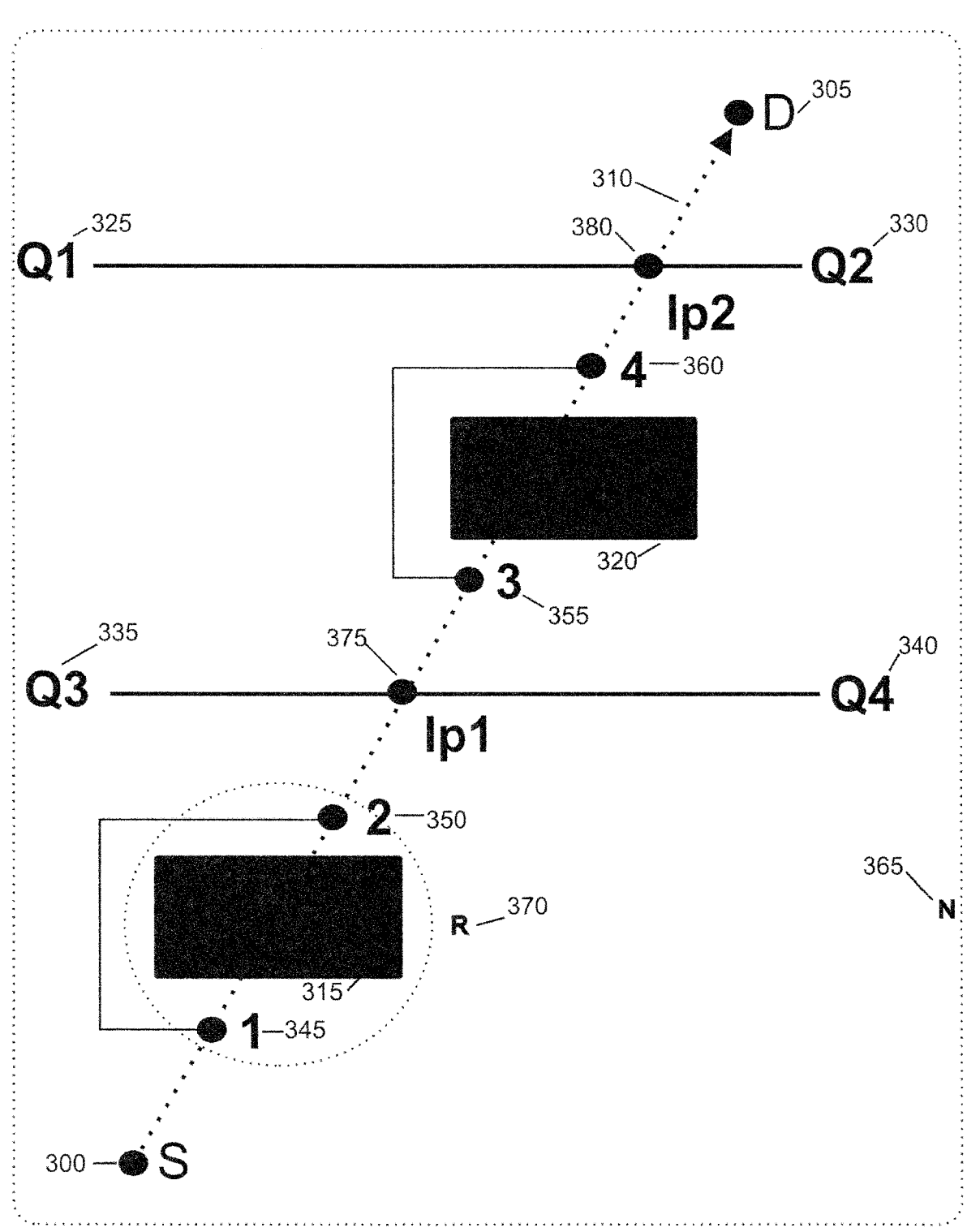
FIG. 3 depicts a Source to Destination initial line segment with existing routes and obstacles.

FIG. 3 depicts an exemplar routing area with a Source point S 300 a Destination point D 305 and an initial path segment between them 310 represented as a dotted line. The initial path segment can be represented a number of line segments or higher order curves. In this embodiment it is shown as a line segment of form Y=mx+b for simplicity, but one familiar in the art would see that the actual equation for the path segment does not alter the intent of this invention as long as the segment can be interpolated. Two waypoints, for example, with no function relating the distance to time between them could not be properly interpolated to find the position for any time or the time for any position unless the connection between the two points was implicitly defined as or assumed to be a straight line or other type of path between the two paths with an associated velocity that was assumed by both the path creation system and the vehicle flight system.

In FIG. 3, obstacles are represented as black rectangles 315, 320. Existing routes are shown extending from Q1 325 to Q2 330 and separately from Q3 335 to Q4 340. Existing line segments are not static in themselves; they can be changed assuming the current path is deleted and a new path generated by the same manner, and that the vehicle can be updated with the new routing.

The obstacles could from a database of LIDAR or other data, or stored in some consistent manner such that the intersection between the S-D line (or other geometry or series of geometric data objects) and the obstruction can be computed. Because there may be many obstacles and searches, it is useful but not necessary for this process to be computationally fast.

Information about the platform itself may be included either as a separate library of known types and/or combined explicit information included in the path request. This capability data specifies diverse metrics of the vehicle performance to inform the path cost function and process. These metrics may also include business-driven parameters such as but not limited to fuel consumption, expendable costs, flight time, arrival time, permissible take-off delays, and priority.

As the initial path segment S-D crosses the obstacles, additional waypoints labeled 1 345, 2 350, 3 355, and 4 360 are shown. The location of the waypoints to avoid the obstacle can be determined as a static distance or algorithmically depending on any or all knowledge about the structure and environment available to the system. This leaves the algorithm with the line segments S-1, 2-3, and 4-D and target routing points of 1-2 and 3-5 to be assigned to the next Multi-Agent search progress.

A dotted rectangle N 365 is shown encompassing the area that is bounded by S and D. For a normal routing system to connect S and D this would represent the order of magnitude of the search space, and the computation speed and storage requirement for a Lee (grid) type router as noted above would be O(N2), or in the case of our 3D model, O(N3) or higher depending on how the 4th Dimension is handled by the algorithm. In this embodiment, the search area is shown by a dotted circle R 370 such that in many cases R is much smaller than N. In another embodiment, there are other search algorithms and techniques which could be used, but one familiar with the art would see that the intent of the invention is the same as long as R is less than N or the overall computation process is less than that of the original routing algorithm without agent processing. Once the routing Agent determines a path from 1-2 and 3-4, the basic path from S to D is complete.

The characteristics of the path are determined by a cost function. The cost function may be implemented as a heuristic or greedy algorithm, but in other embodiments machine learning algorithms such as but not limited to simulated annealing, genetic algorithms, and neural networks can be applied. This cost function can take into account diverse data from the platform and/or environment to create paths that meet all requirements of the AO at any given time.

Similarly, additional non-spatial dimensional fields for data may be expressed in the same format as X, Y, Z, and T dimensions, which can be combined with spatial and time (velocity, acceleration, etc.) dimensions to add avoidance limits, further insight, situational awareness, environmental data, and traffic control data to the flight path construction.

This additional data may also control other aspects of the platform in addition to its flight path such as but not limited to lighting, pyrotechnics, fog, sound effects, attitude, avoidance areas, preferred areas, high speed corridors, maximum speed zones, minimum speed zones, etc. Information from environmental sources such as without limitation cell phone towers, enhanced GPS systems, and other vehicles can also be included in the route cost function to increase accuracy and optimize the routes.

In this embodiment, the complete path initiates the final phase of the algorithm. FIG. 3 shows two intersections between the path computed for S-D and Q3-Q4 as point IP1 375 and the intersection between the path computed for S-D and Q1-Q2 and IP2 380. In this embodiment, given that the velocities and launch times for all paths are given, it is possible to determine if a conflict exists between the two paths at IP1 at a given time. This calculation takes into account without limitation the Avoidance Limit (AL) the Circular Error Probability (CEP) in a number of dimensions and the Confidence Factor (CF) of the platform to be able to maintain its Time/Velocity requirements to create a sphere of confidence in all 4 dimensions. The Confidence Sphere (CS) for each path is calculated and compared for intersection at the time T where the vehicle executing the S-D path would be at IP1.

As an example without limitation, assume the following:

Segment S-1 has a length of 100 m and a Constant Average Velocity (CAV) of 5 m/S.

Segment 1-2 has a combined length of 50 m and CAV of 5 m/S.

Segment 2-IP has a length of 10 m and CAV of 5 m/S.

The time where the vehicle would be at IP1 would then be 32 seconds after launch. Similarly the other path Q3-Q4 would be interpolated to determine its time at location IP1 or conversely its location at Time (IP1).

If this intersection algorithm determines a conflict exists, then a simple calculation between the two spheres gives the time and/or space quantities by which they overlap. Then one or more of the four path variables, X, Y, Z, and T could be manipulated such that they do not overlap. This overlap calculation may also include a minimum vehicle separation factor determined by constant or algorithmic means.

In one embodiment, the easiest variable to manipulate might be T. In this example, if the overlap of the two Confidence Spheres lasts 5 seconds, then slowing the vehicle so that it reaches point IP1 5 seconds later (or earlier, depending on the direction of the computation) solves the conflict in the 4th dimension and the paths are deconflicted in a correct by construction manner. This could be accomplished by slowing any one or combination of the path segments leading up to point IP1, so as a simple example without limitation if segment S-1 is slowed to 4 m/S or the launch time is delayed by 5 seconds, the path is deconflicted.

It is also possible to deconflict the path by altering one or more of the other variables as well. If the CS overlap is a distance of 10 m, then the path could be moved 10 m to the left and the path is again deconflicted, similarly the altitude of the path could be raised or lowered at IP1 to achieve the same results. There may be a number of constraints on any given system, path, airspace, or platform that could be taken into account in determining which variable or combination of variables would prove the best overall path for the system as a whole providing not only deconfliction and cooperative scheduling of vehicles but optimization of the overall airspace as well. One familiar with the art would see that once it is possible to interpolate and predict the position of each vehicle at any given time within a predictable error bounds, deconfliction is possible and the exact methodology applied would not alter the intent of the invention.

In FIG. 3, once the deconfliction of IP1 is complete, it could change the timing value of the other segments of the path, i.e., adding 5 seconds to the IP1 changes the time of the intersection denoted IP2 380. This new time must then be used to detect conflicts between S-D and Q1-Q2 and the same process may be repeated until all path conflicts are removed. In this embodiment, because IP1's deconfliction process added 5 seconds to the delivery time, it may be desirable to the deconfliction of IP2 to be computed by increasing the velocity of the platform to pass ahead of the Q1-Q2 vehicle and thereby make up some if not all of the time lost at IP1. In other embodiments all of the segments could be manipulated up and down to meet overall requirements of the systems.

The final path, where each line segment may have a unique velocity component is S-1, 1-2, 2-IP1, IP1-3, 3-4, 4-IP2, and IP2-D. The final path data may initially be generated by other systems, and then fed into this invention directly or by translation so that the paths of other vehicles created manually or by other routing systems may be added. This allows for new flight plans to be generated cooperatively with paths generated by this system and others as well. Similarly, the path data from this system may be transmitted to other systems for checking or inclusion into their flight planning system. During flight, if communications with other systems or vehicles are available, the flight plan may be transmitted to other vehicles in order to enhance their Detect and Avoid (DAA) capabilities with the knowledge that the vehicle will be at a given position at a given time before the other vehicle's DAA system is even within range of detection.

In other embodiments, a line straightening algorithm may be applied to the S-D overall path at one or more points in the algorithm. Changing the path potentially changes the time of and location at which a conflict could occur, and could change the path sufficiently that new obstacles are detected or new paths come into conflict, thus line straightening may be performed before or after the conflict testing, or both.

Figure 4:
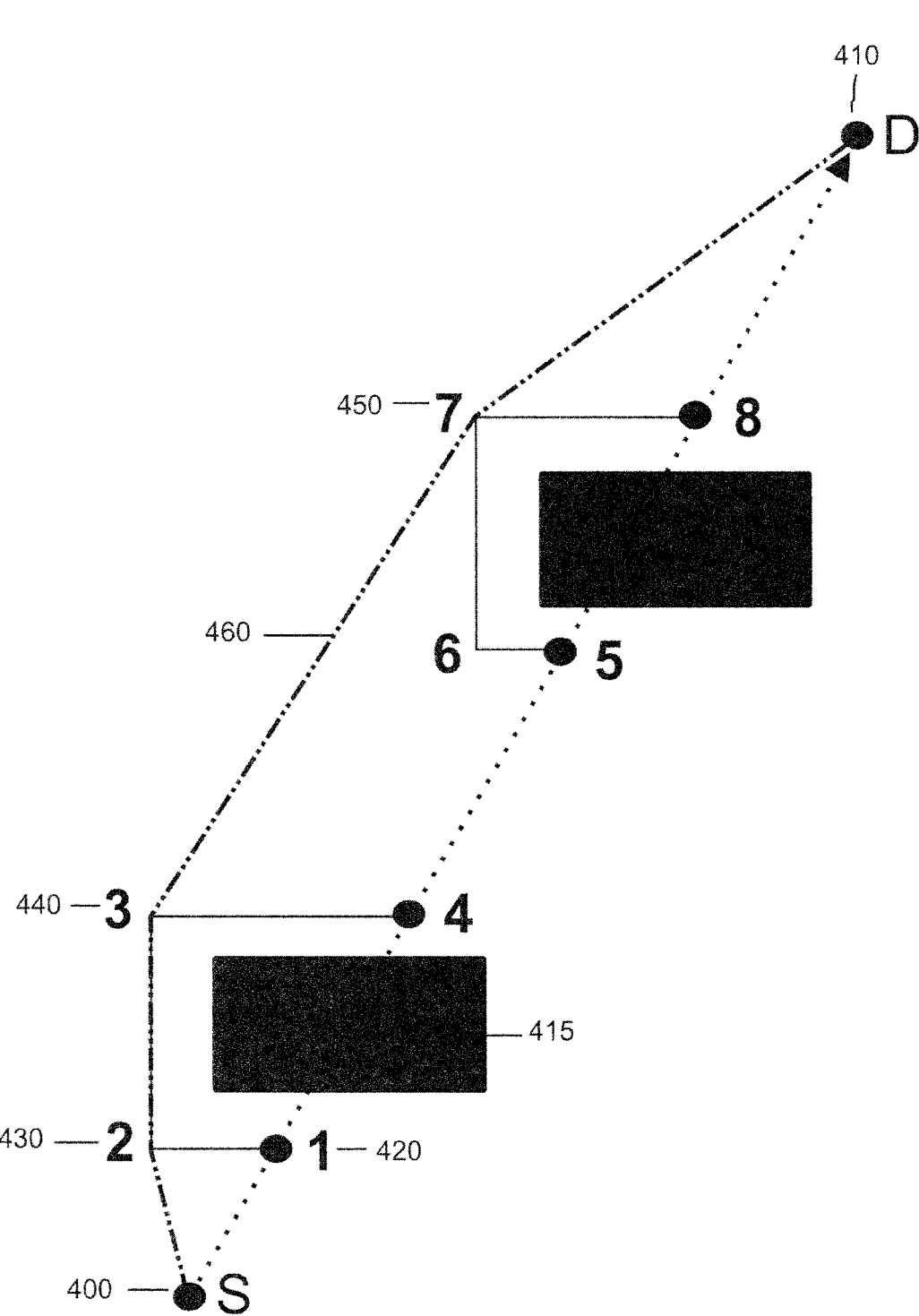
FIG. 4 depicts line straightening applied to the original path.

In one embodiment as depicted in FIG. 4, and exemplar line straightening algorithm might start at S 400, and in the sequence of the route see points labeled 1 420 and 2 430 as next in sequence. The algorithm simply removes the midpoint 1 and evaluates the direct route from S to 2 for additional possible obstacles or conflicts. If none exist, point 1 is removed and the path is now directly from S to 2. The next evaluation would be S to 2 to 3 440, attempting to remove 2. The obstacle 415 does not allow this so the starting point of the straightening algorithm S is moved to point 2, and the 2-3-4 path is evaluated to eliminate 3, which again is not possible. In this manner, the line is converted from the original path to the more efficient path shown in dot/dash line 460. This straightened path is S-2-3-7D. The conflicts with other paths probably still exist, but the time and location will have changed. One familiar in the art would see that altering the line straightening algorithm described would not alter the invention as described, now would the repeated sequence of making a change to the line and then testing for obstructions again.

In another embodiment, two or more Route Agents of the same overall flight path plan could communicate to detect search space overlaps. For example in FIG. 3 if the search agent from point 1 to 2 overlapped with coordinates being searched by the agent for point 3-4, point 2 could be bypassed and the route from 1 to 3 or 4 would still connect the overall flight path. This is one of the benefits of Multi-Agent processing.

Once the route is complete and deconflicted, it may be passed to another third party or government agency for final approval, and then the completed flight plan is returned to the requesting person or service. The flight plan is then loaded into the vehicle for execution with a precise start time or start time window. This assumes that the platform has some mechanism for times synchronization or the loading of the trajectory into the platform is taken as the start of trajectory time, Tzero.

In another embodiment, the trajectory could be specified in relative time and reused with proper coordination with the Traffic Management System. For example, without limitation, if a permanent corridor was constructed such that it was always deconflicted from other traffic, or the corridor and flight plan was set up in advance for multiple days and/or times but released at other days and times.

The systems may also be requested to provide multiple paths at different times, such that the best-known plan is loaded when all other factors are ready for launch. In another embodiment, the path created can be flagged such that its time is not a factor in the flight, i.e., any inflection points are cleared by maneuver in one or more of the X, Y, and Z axes, not T, and any further routes that have an inflection point with this path must also be cleared by maneuver only. This allows for some routes to be prioritized for flight without a start and destination time or with a wider window for start and destination times.

In another embodiment, the Confidence Sphere, Avoidance Limit, or a constant or algorithmic alteration of them, could also be produced as part of the path process to create an inverse geofence, within which the platform must stay during flight. A standard geofence prevents the platform from flying into a defined area. This mechanism prevents the platform from flying out of its pre-defined path limits without approval, and provides a mechanism by which safety systems, either on-board or external to the vehicle can determine if the vehicle is operating within flight parameters. If the vehicle cannot maintain its flight path on time within this inverse geofence constraint, alternative actions can be scheduled or implemented such as but not limited to declaring an emergency, deploying safety measures, communicating with other systems, switching to Detect-And-Avoid only routing, changing to an unmanaged flight level, or landing.

During these emergency procedures this vehicle and or other vehicles would still be required to implement Detect-And-Avoid strategies to prevent collisions or damage to persons or property as appropriate. As long as the vehicle stays within its Avoidance Limit, however, it may maneuver to avoid unforeseen obstacles without causing a cascade failure effect by creating new conflicting paths with other vehicles in the cooperative AO. This could have an impact in determining the size of the inverse geofence in that human piloted or poorly controlled craft might need larger spheres for greater freedom (having less accuracy) in following their trajectory plans.

Figure 5:
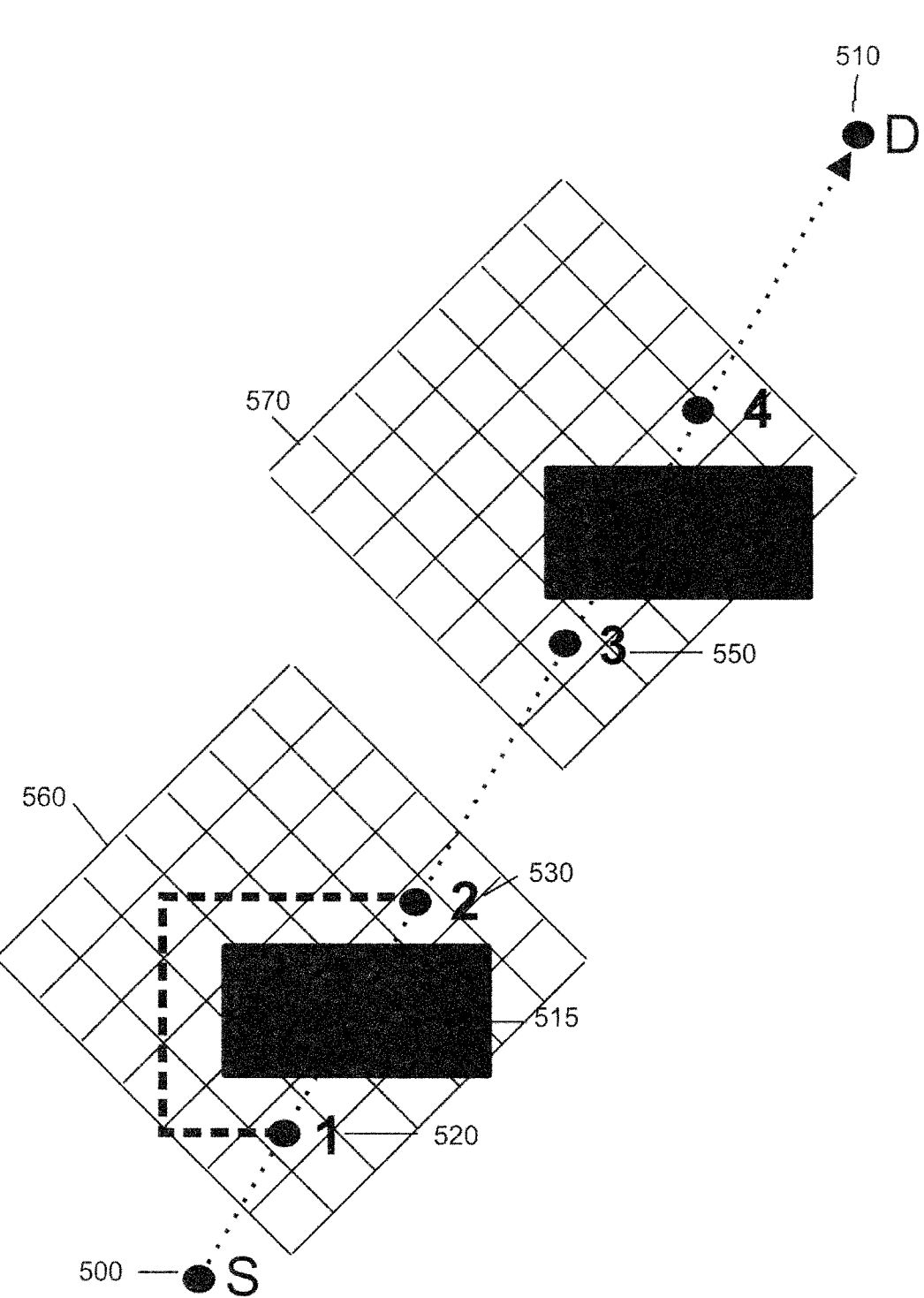
FIG. 5 depicts a virtual gird system.

FIG. 5 shows a diagram of a virtual grid system to find the routes between points. It is possible for this methodology to be utilized for the entire space between the source S 500 and destination D 510. It can, however, greatly speed throughput of the system when employed to connect sub-route sections as described in the embodiments above.

In a virtual grid system, a grid measurement system is imposed on the search algorithmic structure, but not in a 1:1 fashion with the actual physical space. For example without limitation, the routing grid might be set at 1 m separation between grids even though the LIDAR data is on 3 meter spacing between points. Alternatively the grid could be set at 10 m distance even though the LIDAR data is 3 meter spacing. The grid itself does not exist as a permanent memory storage object, only as a parameter or virtual construct.

The virtual grid only exists as new search points are added to the computation structure. As depicted in FIG. 5, Point 1 520 is within a given cell of the grid spacing parameter. The grid data 560 grows as the search expands from Point 1 until it detects that Point 2 530 is within a grid space of the search front. All of the data within the stack 560 is retained until the route is found, with the exception that no grid points are created within the obstruction 515.

Similarly, a simultaneous route agent may be creating another virtual route 570. The virtual grid data does exist, however, in a search stack data object. This stack will grow with each expansion from the Source point, and other data will be maintained in a data collection of all grids searched until the destination is reached. This second data structure provides the retrace functionality to find the path back from the Destination to the Source once the search has expanded to reach the destination point and all cost function and other search requirements have been met. One familiar with the art would see that the actual routing algorithm used does not alter the intent of the invention disclosed. Depth-first search, Breadth-first search, probe, or mesh routing techniques or combinations and duplicates thereof would not alter the fundamental principles of the invention.

The importance of the virtual grid technique is that multiple agents can be working on the same physical space at the same time. In a traditional grid or maze router, this is not possible. Whether or not the agents share information about their searches is dependent on the implementation and would not alter the fundamental principles of the invention. In one embodiment as noted above, agents within the same flight path search may share information, while agents from another flight path search may not. The system may add, delete, or delay agents according to available resources, which is also not possible inn a conventional routing algorithm.

FIGS. 6A and 6B depict pseudo-code of the Multi-Agent routing procedure.

While the foregoing written description of the invention enables one of the ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. Further, different illustrative embodiments may provide different benefits as compared to other illustrative embodiments. The embodiment or embodiments selected are chose and described in order to best explain the principles of the embodiments, the practical application, and to enable others of ordinary skill in the art to understand the disclosure for various embodiments with various modifications as are suited to the particular use contemplated.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specific logical function or functions. It should be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

Figure 7:
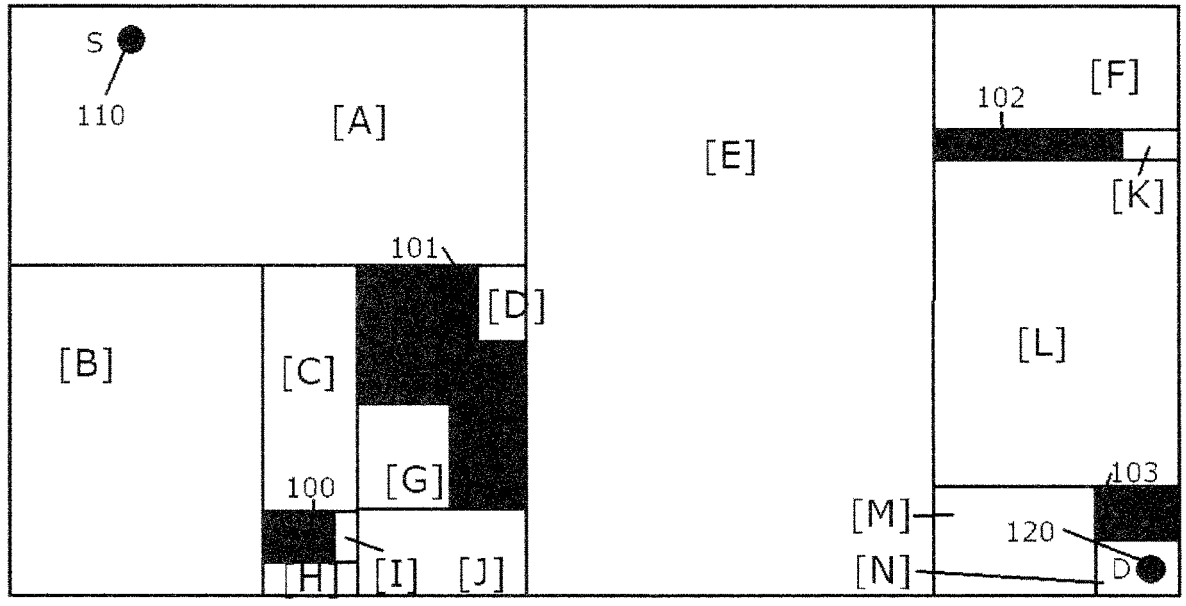
FIG. 7 is an example of a space with rectangular obstructions and free space represented by rectangular polygons.

FIG. 7 depicts a polygon mesh routing technique. This routing technique is demonstrated in two dimensions for brevity and clarity but can be utilized without limitation in three or more dimensions as well. Obstruction polygons 100, 101, 102, 103 are shown, simulating buildings or other obstructions. The Navigation Space Model is depicted as rectangles 110 which represent only the free or navigable portions of the model. The source point 120 and destination point 130 are given.

Figure 8:
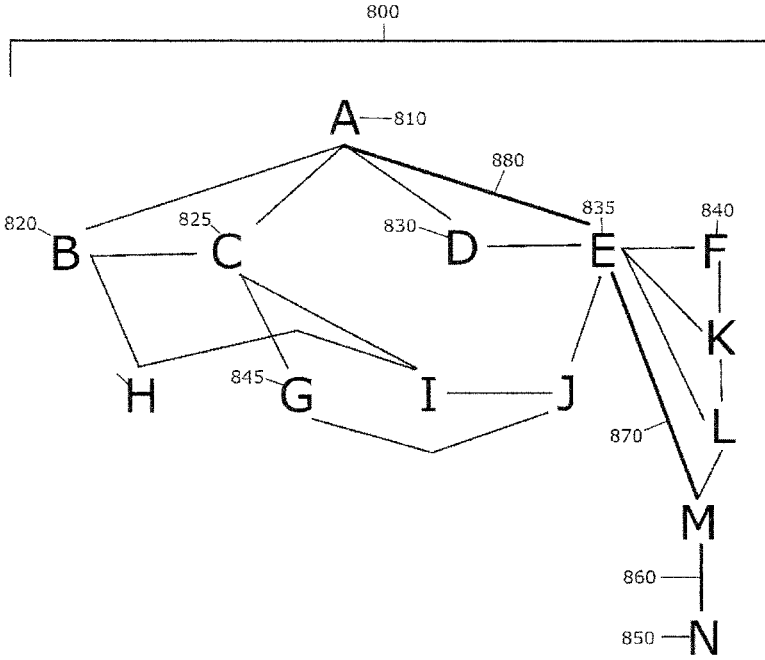
FIG. 8 is an example of the search tree representative of the free space in FIG. 7.

FIG. 8 depicts the search tree 800 of this navigation polygon set. In this embodiment polygon A 810 has connectivity to polygons B 820, C 825, D 830, and E 835. Two faces of the polygon F 840 and G 845 do not connect with another polygon as they are at the edge of the navigation model. The source point is within polygon A, and the destination point is within polygon N 850. Any tree traversal algorithm could be utilized to find a connecting path thought the tree from A to N. Multiple paths are possible, and a cost function could be utilized to determine the appropriate path. The path in bold from N to M 860 then M to E 870 and finally E to A 880 is the path that traverses the fewest number of polygons. One familiar with the art would see that the selection of search technique, cost function, or method of representing the structure graph would not alter the fundamental principles of the invention.

Figure 9:
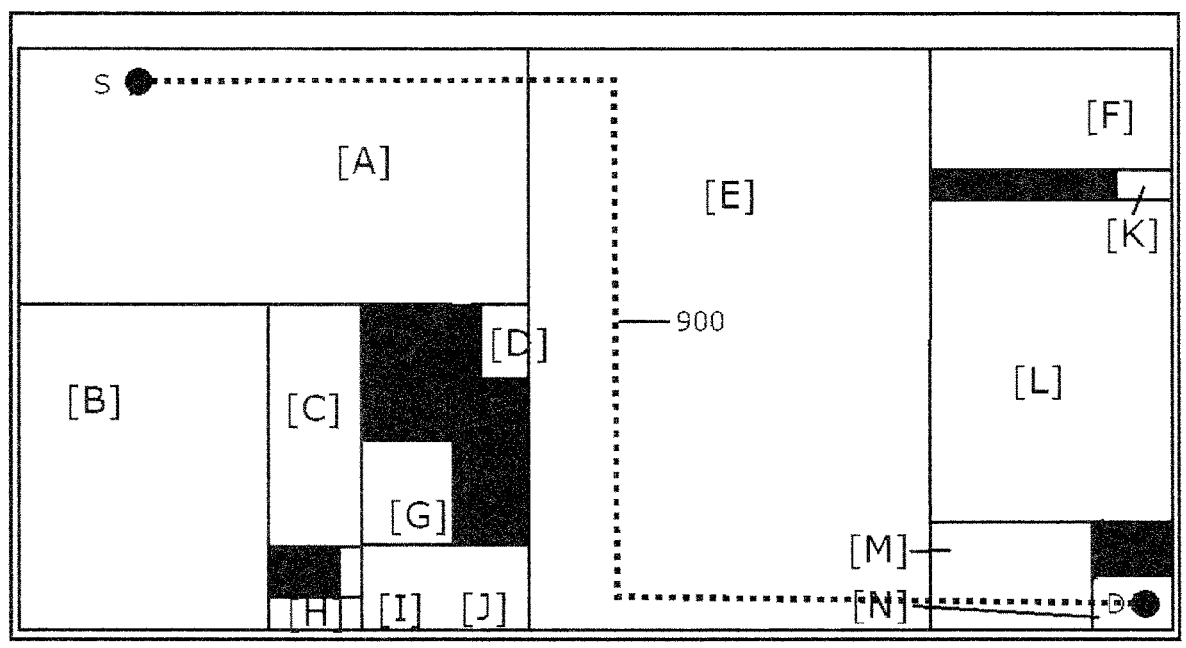
FIG. 9 is an example of the completed search, represented by the polygons and a line traversing the polygons between the source and destination points.

FIG. 9 shows series of lines 900 that link polygons identified in the search tree graph. This could be but might not be the final path created. Line straightening, deviations for temporary obstructions, inflection points, and so on might dictate a different final path.

In another embodiment, these lines could be converted to splines or an arc path from one face to another face may be calculated at a given radius in each dimension. In another embodiment straight line paths but with minimal radius arcs at the turn points could be implemented, for example without limitation, to smooth the ride of an Urban Air Mobility (UAM) vehicle. In another embodiment a sigmoid function or other mathematical expression of geometry might utilized to describe the path as a function of time.

Within each polygon the equation or series of equations for the path and timing through the polygon with all associated data would be given such that the actual path could be reconstructed and/or interpolated to determine the possibility of conflict with another flight path. Each path must enter from one face of the polygon and exit from another face unless it terminates within the polygon. In certain circumstances, it may be possible for the flight path to exit and enter from the same polygon face. There may also be degenerate cases of the polygon construction that leaves a face that is too small for the vehicle to transition through.

In one embodiment, the crossing of the path may be normal to the face of the polygon, but in another embodiment in order to facilitate straighter lines the path may not be normal to the plane of the polygon face in some number of dimensions.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A method of operating a Real-Time Flight Management System (RTFMS), the RTFMS comprising at least one traffic management server and at least one unmanned aerial vehicle (UAV), the method comprising:

mapping an area of operation (AO) in three dimensions to establish a 3D model of the AO, wherein the AO includes static obstructions that are mapped from LIDAR imaging data, and dynamic obstructions corresponding to flight zone keep-out areas having activation and expiration times and dates, and specialized obstructions having minimum altitude restrictions over specified areas within the AO;

saving the 3D model of the AO and its static, dynamic and specialized obstructions within an obstruction database;

transmitting a request for a flight plan from at least one UAV to the RTFMS;

establishing a track line as a flight path in two or more dimensions from a source point to a destination point for the at least one UAV;

searching the obstruction database for obstructions that intersect the track line;

establishing a virtual grid along the track line within the AO, and based on the virtual grid, defining obstruction polygons that simulate the obstructions that intersect the track line from the source point to the destination point, leaving the navigable space within the virtual grid that is separate from the obstruction polygons;

tessellating the navigable space into navigable polygons with the source point and destination point each within a navigable polygon, where the count of the navigable polygons is smaller than the number of grids, each face of a navigable polygon sharing with one other navigable polygon or with no other navigable polygon if that face was blocked by an obstruction;

constructing a flight path search tree of the navigable polygons that depicts the relationships between the navigable polygons, their faces and connecting navigable polygons;

applying a tree transversal algorithm and a cost function to search the flight path search tree; and determining a flight plan for the at least one UAV based upon the fewest number of navigable polygons from the source point to the destination point.

2. The method of claim 1, further comprising forming the obstruction database from the LIDAR imaging data and 3D imaging data or stacked 2-dimensional image data forming the 3D model.

3. The method of claim 1, wherein obstructions comprise objects that a respective flight vehicle could not fly over.

4. The method of claim 1, comprising establishing a tangent line against obstruction polygons within the obstruction database to determine if an intersection exists, and if yes, spacing the flight path from the intersection.

5. The method of claim 1, comprising completing the flight path from the source point to the destination point that includes arcs and tangent line segments.

6. The method of claim 1, wherein the RTFMS determines that a potential conflicting path occurs with another UAV, and modifies the flight plan for the at least one UAV to avoid a collision.

7. The method of claim 1, wherein the RTFMS establishes the virtual grid within a defined space of the AO that encompasses the track line.

8. The method of claim 1, wherein the RTFMS includes a request buffer into which requests for flight plans from UAV's are added, and as computational resources become available within the RTFMS, at least one request for flight plan is retrieved from the request buffer for further processing.

9. The method of claim 1, comprising employing the tree transversal algorithm and cost function to modify the flight plan for a respective UAV around an obstruction polygon from a first intersection of the track line to the polygon edge or vertex to the last intersection of the track line to the polygon edge or vertex and maintaining a continuous path from the source point to the destination point.

10. The method of claim 1, wherein static obstructions comprise objects within the AO that the respective UAV cannot fly over.

11. The method of claim 1, wherein the obstruction polygons are substantially rectangular configured.

12. The method of claim 1, wherein the navigable polygons are substantially rectangular configured.

13. The method of claim 1, wherein the virtual grid comprises a virtual construct within memory of the RTFMS.

* * * * *